(12) United States Patent
Yamashita

(10) Patent No.: US 6,377,614 B1
(45) Date of Patent: Apr. 23, 2002

(54) SPREADING CODE SYNCHRONIZATION CIRCUIT AND METHOD

(75) Inventor: Noboru Yamashita, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/310,985

(22) Filed: May 13, 1999

(30) Foreign Application Priority Data

Sep. 16, 1998 (JP) .......................................... 10/261517

(51) Int. Cl.[7] .............................................. H04B 7/216
(52) U.S. Cl. ...................................... 375/149; 375/148
(58) Field of Search ................................ 375/134, 137, 375/144, 145, 148, 149; 370/335, 342

(56) References Cited

U.S. PATENT DOCUMENTS

| | | | | |
|---|---|---|---|---|
| 5,361,276 A | * | 11/1994 | Subramanian | 375/150 |
| 5,590,160 A | * | 12/1996 | Ostman | 375/367 |
| 5,689,525 A | * | 11/1997 | Takeishi et al. | 375/141 |
| 5,808,585 A | * | 9/1998 | Javitt et al. | 370/342 |
| 5,867,525 A | * | 2/1999 | Giallorenzi et al. | 375/145 |
| 5,910,948 A | * | 6/1999 | Shou et al. | 370/335 |
| 5,940,433 A | * | 8/1999 | Sawahashi et al. | 375/149 |
| 5,943,362 A | * | 8/1999 | Saito | 375/143 |
| 6,081,547 A | * | 6/2000 | Miya | 375/130 |
| 6,094,449 A | * | 7/2000 | Komatsu | 375/136 |
| 6,163,567 A | * | 12/2000 | Hatch | 375/149 |
| 6,212,222 B1 | * | 4/2001 | Okubo et al. | 375/149 |
| 6,222,834 B1 | * | 4/2001 | Kondo | 370/342 |
| 6,298,050 B1 | * | 10/2001 | Van Heeswyk et al. | 370/335 |

FOREIGN PATENT DOCUMENTS

EP       0 691 754 A2   *   1/1996

* cited by examiner

*Primary Examiner*—Young T. Tse
(74) *Attorney, Agent, or Firm*—Venable; Robert J. Frank; Michael A. Sartori

(57) ABSTRACT

A spreading code synchronization circuit in a RAKE receiver in a spread-spectrum mobile communication system reassigns receiver fingers that are tracking substantially the same synchronization positions as other fingers, as well as reassigning fingers that are tracking synchronization positions with low correlation power. Under adverse multipath reception conditions, receiver fingers are quickly released from weak signal components and reassigned to stronger signal components, while maximum path diversity is maintained.

10 Claims, 6 Drawing Sheets

SPREADING CODE SYNCHRONIZATION CIRCUIT AND METHOD

BACKGROUND OF THE INVENTION

The present invention relates to a circuit for and method of synchronization of a spreading code in a spread-spectrum mobile wireless communication system of the direct-sequence code division multiple access (DS-CDMA) type.

In DS-CDMA systems, a transmitting station and a receiving station spread and despread a data signal by use of the same spreading code, which is typically a pseudorandom noise (PN) sequence of values of plus and minus one, referred to as chips. The data signal is spread by multiplication by the spreading code, the chip rate being higher than the data symbol rate. Despreading is carried out by a correlation process that multiplies the received signal by the spreading code and averages the products over each data symbol interval.

Different PN sequences have approximately zero cross-correlation, enabling a number of transmitters and receivers to share the same frequency band. The number is proportional to the ratio of the chip rate to the data symbol rate, referred to as the processing gain. Each PN sequence also has a sharply peaked autocorrelation function, requiring the spreading code used for despreading at the receiver to be closely synchronized with the transmitter's spreading code.

The spreading code used for despreading at the receiver will also be referred to below as the despreading code.

Because the transmission channel in mobile wireless communication systems is usually a multipath channel, with different signal components arriving on different paths with different delays, RAKE receives are often employed. A RAKE receiver in a DS-CDMA system has a plurality of despreading units, sometimes referred to as demodulating elements or fingers, in which the despreading code can be delayed by different amounts, synchronized with different signal components. The despread data obtained in the different fingers are combined into a single received data signal.

Because the delay characteristics of a multipath channel tend to vary as the receiver moves, each finger has a synchronization tracking unit that tracks changes in the delay of the corresponding signal component. One type of synchronization tracking unit that is commonly employed is a delay-locked loop (DLL) that correlates the received signal with an early code advanced by half a chip from the despreading code, and a late code delayed by half a chip from the despreading code. The timing of the despreading code is adjusted according to the difference in correlation power between the early code and late code.

Because the attenuation characteristics of the multipath channel also tend to vary, known receivers have a synchronization acquisition unit that constantly searches for new signal components to which the receiver fingers can be reassigned, so that the receiver fingers are always assigned to the strongest received components.

However, the accuracy of the synchronization acquisition unit and the synchronization tracking units is limited. One resulting problem is that the synchronization acquisition unit may detect the same path component at two different synchronization positions, which are assigned to two different receiver fingers. Both fingers then track the same path component, reducing the path diversity of the receiver, thus reducing the amount of transmitted signal power than can be demodulated. The same problem occurs if a synchronization tracking unit wanders off its assigned synchronization position and onto a nearby synchronization position assigned to a different receiver finger.

This problem also occurs when the synchronization acquisition unit detects a path component that is already being tracked, but at a slightly different synchronization position. The result in this case may be that two fingers are assigned to the same component, or that a finger is unnecessarily reassigned to the component it was already tracking, the reassignment being accompanied by a temporary interruption of demodulation of the component.

In addition, when the power of a signal component that is being tracked fades rapidly, the finger tracking that component may lose synchronization entirely and begin producing a despread signal consisting entirely of noise. This situation also occurs when a signal path simply disappears, an occurrence not unusual in mobile communications. Normally, the finger will quickly be reassigned to a valid signal component, but if no new component appears, noisy output may continue for some time.

SUMMARY OF THE INVENTION

It is accordingly an object of the present invention to provide a spreading code synchronization method and circuit, for use in a receiver in a spread-spectrum mobile communication system, that reassigns synchronization tracking units in such a way that multipath signal components are tracked efficiently, and demodulation of the received signal continues without interruption, even under difficult reception conditions.

The invented spreading code synchronization circuit has a synchronization acquisition unit that performs a sliding correlation to obtain a list of synchronization positions with correlation power values exceeding an acquisition threshold, a positive number of synchronization tracking units that, when active, track changes in the synchronization of a spreading code in a received signal, starting from an assigned synchronization position, and an assignment control unit that assigns synchronization positions to synchronization tracking units. The assignment control unit selects a candidate list of acquired synchronization positions mutually separated by at least a predetermined phase difference, and performs the following processes:

a tracked synchronization position exclusion process that removes synchronization positions close to points already being tracked by active synchronization tracking units from the candidate list;

an assignable synchronization position selection process that selects a predetermined number of most strongly correlated synchronization positions from the candidate list as assignable synchronization positions;

an idle tracking unit check process that selects inactive synchronization tracking units as assignable synchronization tracking units;

a duplicate tracking check process that finds different synchronization tracking units tracking substantially identical synchronization positions, and selects all but one of them as assignable synchronization tracking units;

a low power check process that selects active synchronization tracking units tracking synchronization positions with low correlation power as assignable synchronization tracking units;

a reassignment process that assigns assignable synchronization positions to assignable synchronization tracking units; and a window adjustment process that selects the sliding correlation window to be used in the next sliding correlation.

In one aspect of the invention, each active synchronization tracking unit measures the correlation power at the tracked synchronization position, and the low power check process compares the measured correlation power values with a predetermined low power threshold.

In another aspect, the low power check process selects active synchronization tracking units tracking synchronization positions that are not close to any synchronization position acquired by the synchronization acquisition unit.

In another aspect, the window adjustment process centers the sliding correlation window at a midpoint of the synchronization positions tracked by the active synchronization tracking units.

In another aspect, the synchronization acquisition unit uses a fixed acquisition threshold.

In another aspect, the synchronization acquisition unit stores a maximum correlation power value obtained in a preceding sliding correlation, and calculates the acquisition threshold by dividing the stored maximum correlation power value by a predetermined constant, or by subtracting a predetermined constant from the stored maximum correlation power value.

In another aspect, the reassignment process assigns assignable synchronization positions first to the synchronization tracking units selected in the duplicate tracking check process, then to synchronization positions selected in the idle tracking unit check process, and finally to synchronization positions selected in the low power check process.

The invented spreading code synchronization method carries out the processes described above, comprising the steps of:

(a) performing a sliding correlation to obtain a list of synchronization positions;

(b) selecting, from this list, a candidate list of sufficiently separated synchronization positions;

(c) removing synchronization positions close to synchronization positions already being tracked from the candidate list;

(d) selecting assignable synchronization positions from the candidate list;

(e) selecting inactive synchronization tracking units;

(f) selecting all but one from any group of synchronization tracking units tracking substantially identical synchronization positions;

(g) selecting synchronization tracking units with low correlation power;

(h) assigning the assignable synchronization positions to the synchronization tracking units selected in steps (e), (f), and (g); and (i) selecting the next sliding correlation window for use in step (a).

Synchronization tracking units selected in said steps (f), (e), and (g) may be taken in this order in step (h).

DETAILED DESCRIPTION OF THE INVENTION

Figure 1:
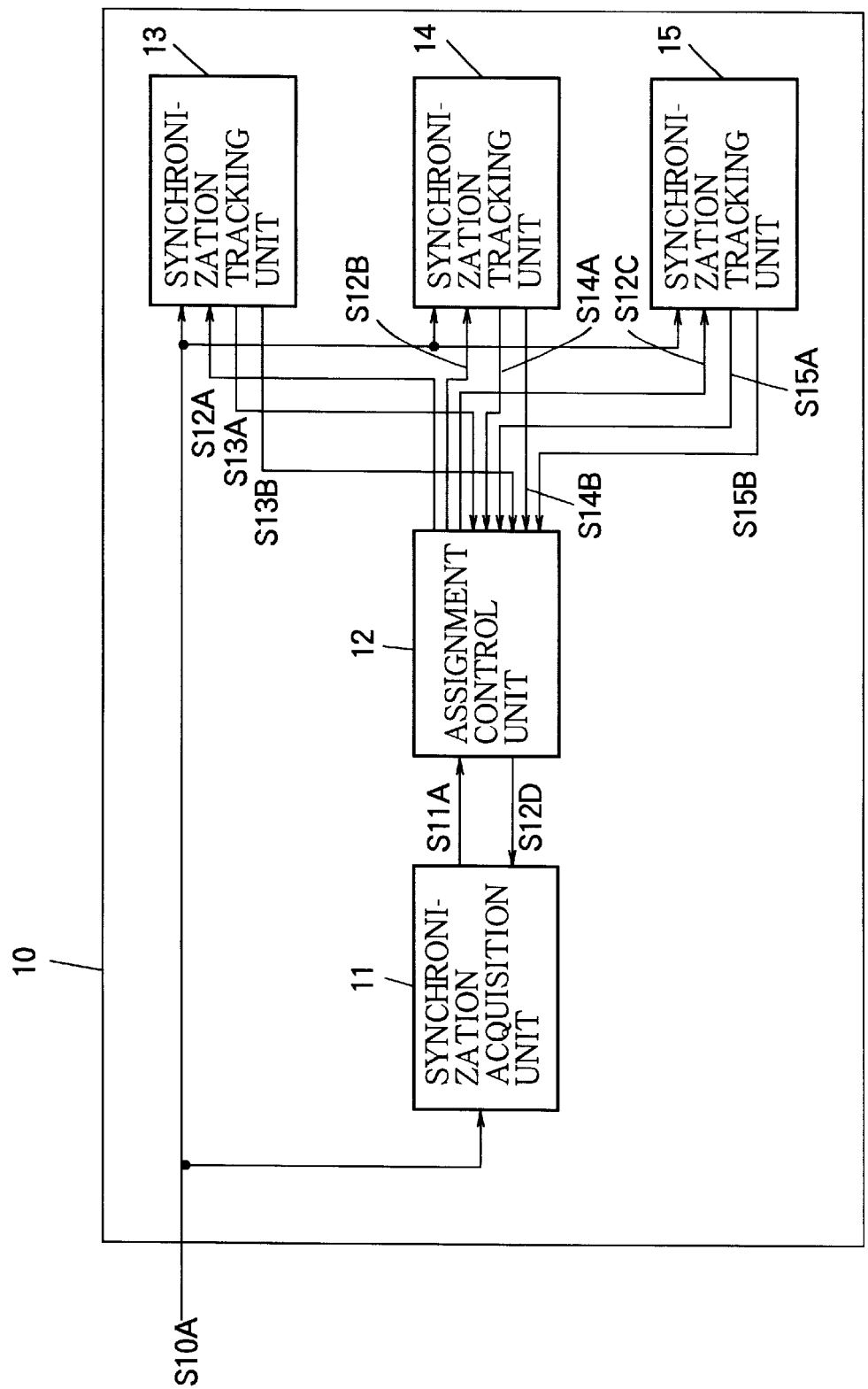
FIG. 1 is a block diagram of a first embodiment of the invention.

Embodiments of the invention will be described with reference to the attached drawings, in which like steps are indicated by like reference characters. The embodiments are suitable for use in base stations and mobile stations in DS-CDMA mobile communication systems.

Referring to FIG. 1, the first embodiment is a spreading code synchronization circuit 10 comprising a synchronization acquisition unit 11, an assignment control unit 12, and a plurality of synchronization tracking units (for example, three synchronization tracking units) 13, 14, 15. A received signal S10A is supplied to the synchronization acquisition unit 11 and the synchronization tracking units 13, 14, 15. Each synchronization tracking unit is part of a receiver finger that includes a correlator (not visible) for despreading the signal component being tracked.

The synchronization acquisition unit 11 receives a window centering signal S12D from the assignment control unit 12, designating the center point of a sliding correlation window. The synchronization acquisition unit 11 performs a sliding correlation between the received signal 10A and a designated spreading code, and sends the assignment control unit 12 an acquired synchronization position signal S11A listing the synchronization positions acquired in the sliding correlation. This list of acquired synchronization positions will be referred to as the acquisition list.

From the acquisition list output by the synchronization acquisition unit 11, the assignment control unit 12 selects a candidate list of synchronization positions that are mutually separated by at least a certain amount. The assignment control unit 12 then carries out a series of processes that select assignable synchronization positions from the candidate list and assignable synchronization tracking units from among the plurality of synchronization tracking units 13, 14, 15, and sends synchronization position assignment signals S12A, S12B, S12C, each designating an assigned synchronization position, to one or more of the assignable synchronization tracking units. Synchronization position assignment signal S12A is sent to synchronization tracking unit 13, synchronization position assignment signal S12B to synchronization tracking unit 14, and synchronization position assignment signal S12C to synchronization tracking unit 15.

Each of the synchronization tracking units 13, 14, 15 becomes active upon receiving a synchronization position assignment signal from the assignment control unit 12. When activated in this way, each synchronization tracking unit begins tracking the spreading code in one component of the received signal S10A, starting from the assigned synchronization position. At certain intervals, the active synchronization tracking units 13, 14, 15 report the present positions of the synchronization positions they are tracking to the assignment control unit 12 in respective synchronization position signals S13A, S14A, S15A. The active synchronization tracking units 13, 14, 15 also measure the correlation power of the signal components at the synchronization positions they are tracking, and report the results to the assignment control unit 12 in respective correlation power signals S13B, S14B, S15B.

Next, the operation of the synchronization acquisition unit 11 will be described in more detail. It will be assumed that the spreading code comprises a PN sequence, which is repeated cyclically. The timing of the spreading code will also be referred to as the phase of the spreading code.

The sliding correlation window is initially the entire phase range of the spreading code. The synchronization acquisition unit 11 slides the phase of the spreading code in steps of a predetermined size, correlates the spreading code with the received signal S10A at each phase position, calculates a correlation power value at each position, and selects positions giving correlation power values equal to or greater than a fixed acquisition threshold.

Following the first sliding correlation, the sliding correlation window is narrowed to a predetermined width, centered at the position indicated by the window centering signal S12D from the assignment control unit 12. After receiving this signal from the assignment control unit 12, the synchronization acquisition unit 11 carries out a second sliding correlation within the designated window, and outputs an acquisition list of synchronization positions acquired within the window. The synchronization acquisition unit 11 then waits to receive another window centering signal from the assignment control unit 12, and repeats the same process again.

The step size in each sliding correlation is preferably equal to or less than one chip.

Figure 2:
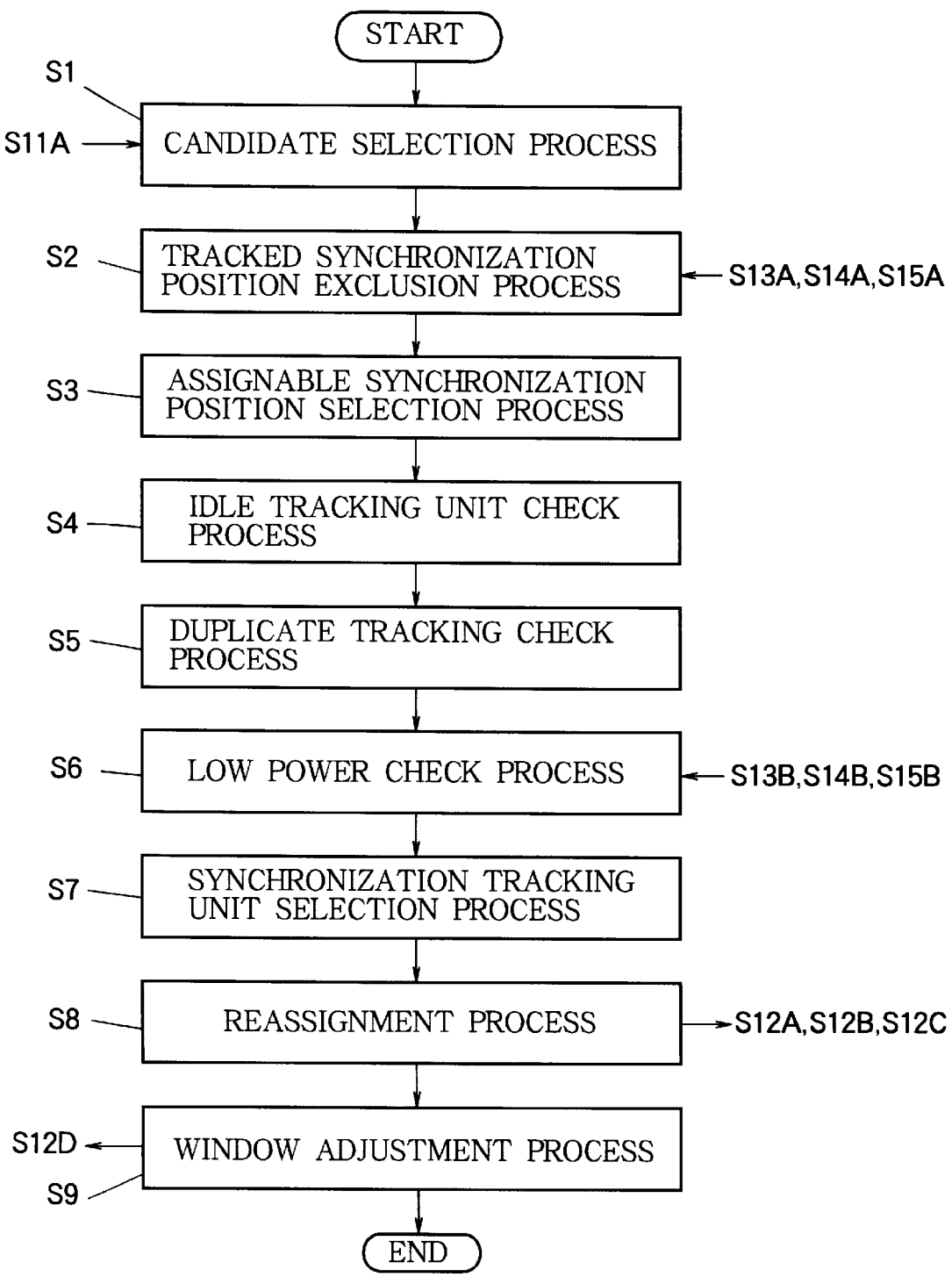
FIG. 2 is a flowchart illustrating the operation of the first embodiment.

The operation of the assignment control unit 12 will be described with reference to FIG. 2. Steps S1 to S9 in this flowchart are carried out each time the assignment control unit 12 receives a new acquisition list from the synchronization acquisition unit 11.

Step S1 is the candidate selection process, in which the assignment control unit 12 sorts the synchronization positions on the acquisition list in order of their correlation power, and compares their phase positions. Especially if the step size in the sliding correlation was less than one chip, the same signal component may have been acquired more than once, by exceeding the acquisition threshold at two or more consecutive phase positions. Accordingly, if any two synchronization positions on the acquisition list are separated by less than one chip, the assignment control unit 12 discards the synchronization position with the smaller correlation power. When all pairs of synchronization positions have been compared, those that are left form a candidate list, arranged in order of correlation power, on which any two synchronization positions are separated by at least one chip.

Step S2 is the tracked synchronization position exclusion process, in which the assignment control unit 12 compares the synchronization positions on the candidate list with the synchronization positions already being tracked, as reported in the synchronization position signals S13A, S14A, S15A from active synchronization tracking units 13, 14, 15. Synchronization positions that are less than one chip away from synchronization positions already being tracked are removed from the candidate list.

Step S3 is the assignable synchronization position selection process, in which the assignment control unit 12 selects a predetermined number M of synchronization positions from the candidate list as assignable synchronization positions, choosing those with the greatest correlation power. If the candidate list has only M synchronization positions, or has fewer than M synchronization positions, the assignment control unit 12 selects all of the synchronization positions on the candidate list.

Step S4 is the idle tracking unit check process, in which the assignment control unit 12 selects all inactive synchronization tracking units 13, 14, 15 as assignable synchronization tracking units.

Step S5 is the duplicate tracking check process, in which the assignment control unit 12 compares all synchronization positions being tracked by active synchronization tracking units 13, 14, 15. If two or more synchronization positions mutually separated by less than one chip are being tracked by different synchronization tracking units, the assignment control unit 12 selects all but one of these synchronization tracking units as assignable synchronization tracking units.

Step S6 is the low power check process, in which the assignment control unit 12 compares the correlation power values of active synchronization tracking units 13, 14, 15 that have not yet been selected as assignable synchronization tracking units with a predetermined low power threshold, and adds those synchronization tracking units with correlation power values below the low power threshold to the set of assignable synchronization tracking units. The correlation power values are received from the synchronization tracking units in the correlation power signals S13B, S14B, S15B.

Step S7 is a synchronization tracking unit selection process, in which the assignment control unit 12 selects a predetermined number of assignable synchronization tracking units, preferably equal to the predetermined number M of assignable synchronization positions that can be selected.

Step S8 is the reassignment process, in which the assignment control unit 12 assigns the assignable synchronization positions selected in step S3 to the assignable synchronization tracking units 13, 14, 15 selected in step S7. These synchronization tracking units then begin tracking from their newly assigned synchronization positions.

Step S9 is the window adjustment process, in which the assignment control unit 12 sends the synchronization acquisition unit 11 a window centering signal S12D designating the midpoint of the synchronization positions now being tracked by active synchronization tracking units 13, 14, 15.

Next, the operation of the synchronization tracking units 13, 14, 15 will be described. As noted above, synchronization tracking unit 13 becomes active upon receiving a synchronization position assignment signal S12A, synchronization tracking unit 14 becomes active upon receiving a synchronization position assignment signal S12B, and synchronization tracking unit 15 becomes active upon receiving a synchronization position assignment signal S12C. While active, the synchronization tracking units 13, 14, 15 employ the known delay-locked loop method, for example, to track their assigned synchronization positions. The correlation power values reported in the correlation power signals 13B, 14B, 15B are, for example, the correlation power at the point halfway between the early code and the late code in the delay-locked loop.

An active synchronization tracking unit becomes inactive when it is selected as assignable by the assignment control unit 12, but is not actually assigned a new synchronization position because there are too few assignable synchronization positions.

In the first embodiment, as in the prior art, when strong new signal components appear, receiver fingers that were tracking weaker signal components are reassigned to the new components.

In addition, when a signal component that was being tracked fades to a low power level, if no new signal component to which its synchronization tracking unit can be reassigned appears, that synchronization tracking unit becomes inactive, through being selected in the low power check in step S6 but not reassigned in the reassignment process in step S8. The receiver finger assigned to this weak component is thereby taken out of service, avoiding a noisy contribution to the combined demodulated signal.

In the extreme case in which the correlation power of all active synchronization tracking units falls below the low power threshold, all of them are either made inactive or reassigned to new, stronger path components.

If a situation arises in which two or more receiver fingers are despreading the same path component, the synchronization tracking units of all but one of these fingers are reassigned or made inactive. The candidate selection process carried out in step S1 and the tracked synchronization position exclusion process carried out in step S2 also prevent different synchronization tracking units from being assigned to the same path component. Thus, the first embodiment does not ignore a receivable path component while allowing duplicated tracking of another component by multiple synchronization tracking units. In this way, the first embodiment attempts to maintain maximum path diversity and maximum utilization of the useful power of the received signal.

By assigning only new synchronization positions that are separated by at least one chip from synchronization positions already being tracked, the first embodiment avoids unnecessary interruptions in demodulation due to unnecessary reassignment of synchronization tracking units to signal components they were already tracking.

By reassigning inactive synchronization tracking units, the first embodiment uses the synchronization tracking units effectively by keeping as many active as possible.

For the above reasons, the first embodiment is able to maintain reception by tracking a suitable group of multipath components, even under difficult receiving conditions.

Next, a second embodiment will be described. The second embodiment differs from the first embodiment in that the threshold used by the synchronization acquisition unit is set in relation to the maximum correlation power detected in the preceding sliding correlation, and the synchronization tracking units do not calculate the correlation power of the tracked signal components.

Figure 3:
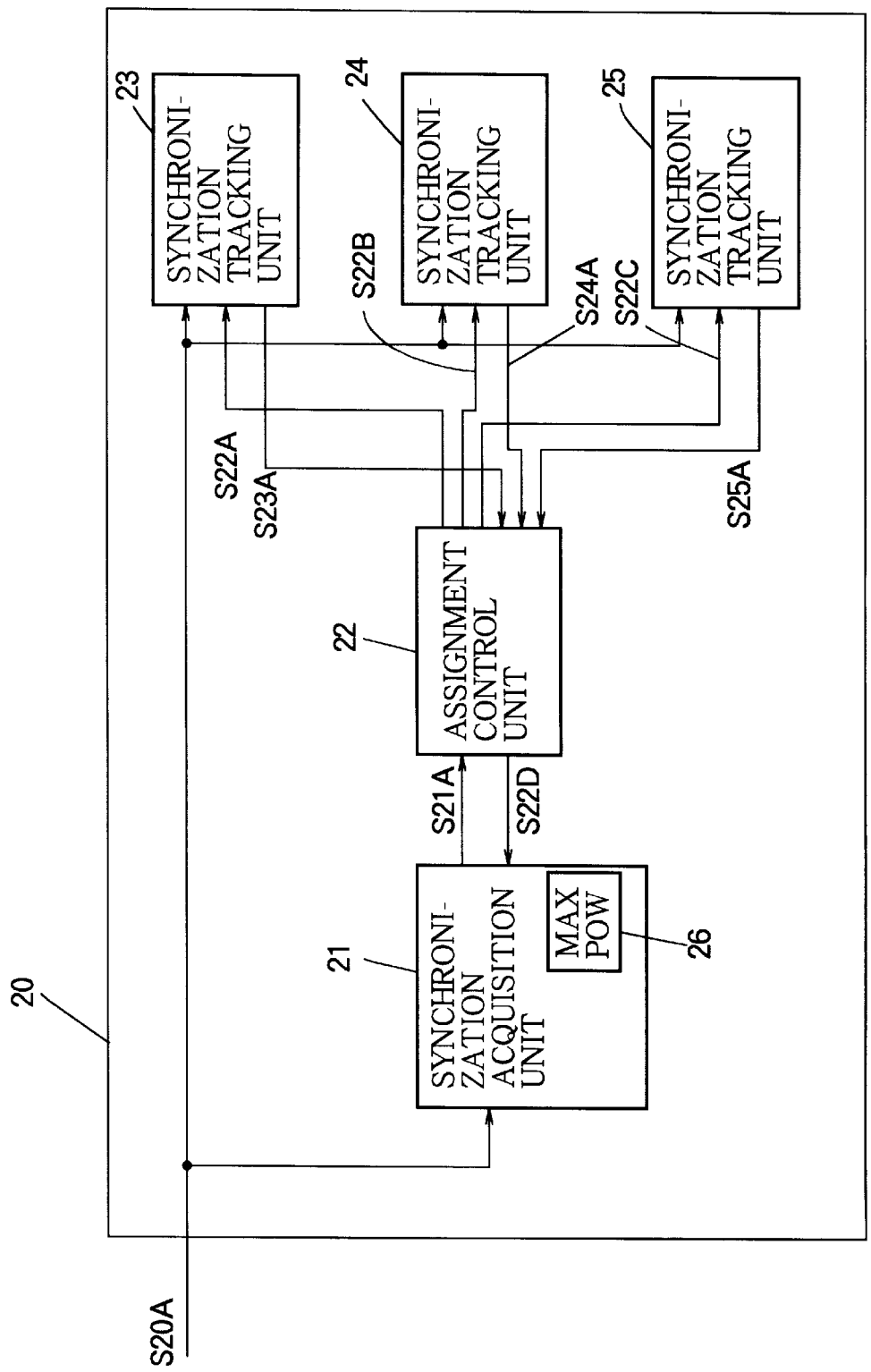
FIG. 3 is a block diagram of a second embodiment of the invention.

Referring to FIG. 3, the second embodiment is a spreading code synchronization circuit 20 comprising a synchronization acquisition unit 21, an assignment control unit 22, and a plurality of synchronization tracking units 23, 24, 25. The received signal S20A is supplied to the synchronization acquisition unit 21 and the synchronization tracking units 23, 24, 25. The synchronization acquisition unit 21 sends an acquired synchronization position signal S21A to the assignment control unit 22, and receives a window centering signal S22D from the assignment control unit 22. The assignment control unit 22 sends synchronization position assignment signals S22A, S22B, S22C to the synchronization tracking units 23, 24, 25, and receives synchronization position signals S23A, S24A, S25A from the synchronization tracking units 23, 24, 25.

The synchronization acquisition unit 21 performs a sliding correlation as in the first embodiment, and places synchronization positions having correlation values greater than an acquisition threshold on the acquisition list sent to the assignment control unit 22 in the acquired synchronization position signal S21A. The synchronization acquisition unit 21 also stores the maximum correlation power found in the sliding correlation in a maximum power (MAX POW) memory 26.

In the first sliding correlation performed by the synchronization acquisition unit 21, the acquisition threshold has a predetermined value. In each subsequent sliding correlation, the acquisition threshold is set equal to the maximum correlation power found in the preceding sliding correlation, divided by a predetermined constant.

Figure 4:
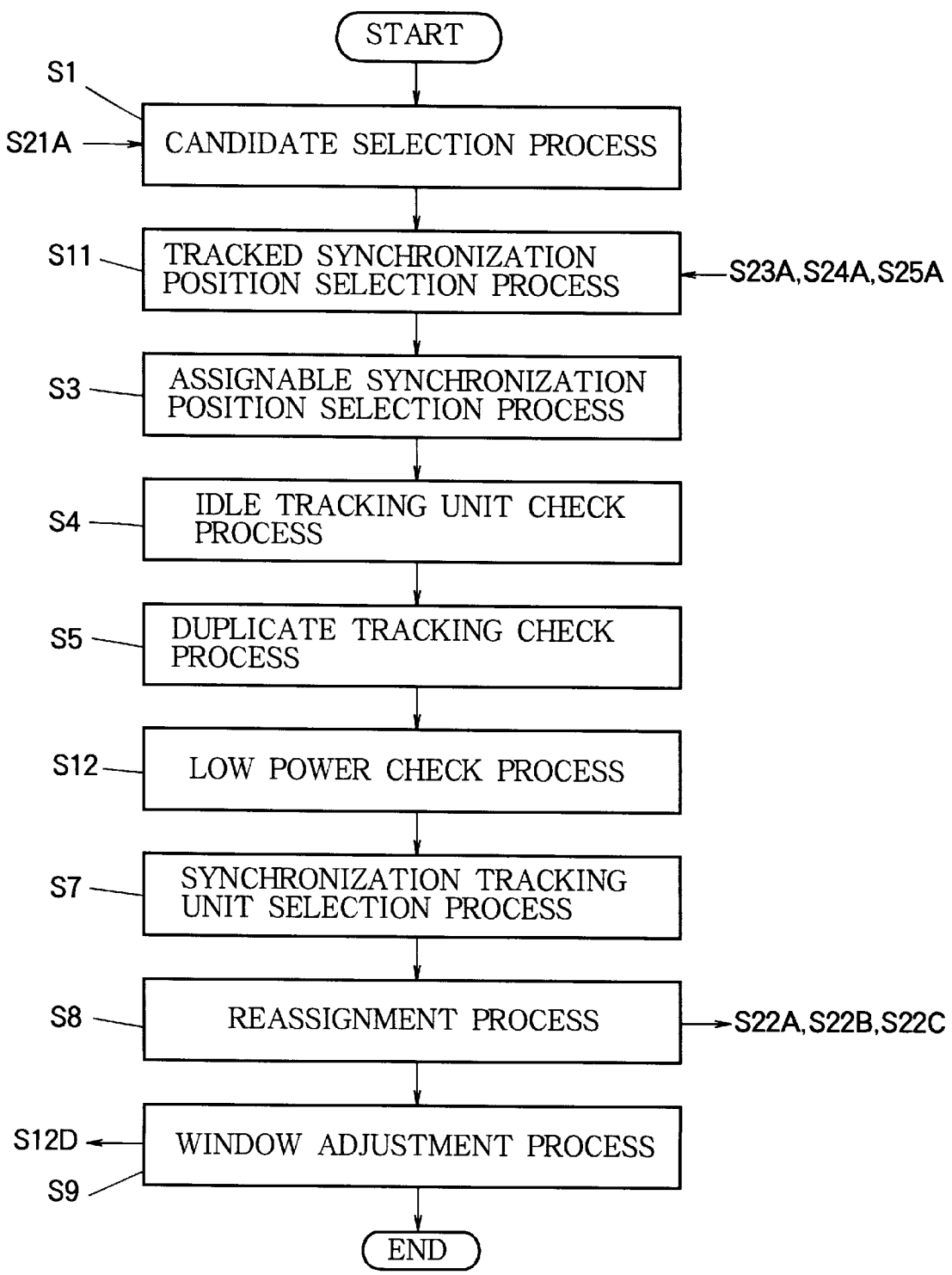
FIG. 4 is a flowchart illustrating the operation of the second embodiment.

The operation of the assignment control unit 22 will be described with reference to the flowchart in FIG. 4.

Step S1 is the same candidate selection process as performed in the first embodiment, producing a candidate list of synchronization positions arranged in order of correlation power, with each two synchronization positions separated by at least one chip.

Step S11 is a tracked synchronization position exclusion process similar to step S2 in the first embodiment, in which synchronization positions that are already being tracked are removed from the candidate list. In the second embodiment, when the assignment control unit 22 finds a candidate synchronization position that is less than one chip distant from a synchronization position being tracked by a synchronization tracking unit, besides removing the candidate synchronization position from the candidate list, it flags the synchronization tracking unit as valid.

Steps S3, S4, S5 are the same assignable synchronization position selection process, idle tracking unit check process, and duplicate tracking check process as performed in the first embodiment. In the duplicate tracking check process, synchronization tracking units 23, 24, 25 can be selected as assignable even if they have been flagged in step S11.

Step S12 is a low power check process in which the assignment control unit 22 selects synchronization tracking units tracking synchronization positions distant by at least one chip from all synchronization positions on the acquisition list output from the synchronization acquisition unit 21 in the acquired synchronization position signal S21A, and adds these synchronization tracking units to the set of assignable synchronization tracking units obtained in steps S4 and S5. Since all synchronization tracking units tracking synchronization positions less than one chip distant from any of the synchronization positions acquired by the synchronization acquisition unit 21 have already been flagged as valid in step S11, the assignment control unit 22 simply adds all synchronization tracking units that were not flagged in step S11 to the set of assignable synchronization tracking units.

Steps S7, S8, and S9 are the same synchronization tracking unit selection process, reassignment process, and window adjustment process as performed in the first embodiment.

The synchronization tracking units 23, 24, 25 operate in the same way as in the first embodiment, except that they do not output the correlation power at the synchronization positions that they are tracking.

The second embodiment provides effects similar to those of the first embodiment, without requiring input of correlation power values from the synchronization tracking units 23, 24, 25 to the assignment control unit 22.

Recalculation of the acquisition threshold after every sliding correlation enables the second embodiment to adapt the acquisition threshold to changing channel conditions. When a strong signal component is present, the acquisition threshold is set high, so that the second embodiment does not unnecessarily acquire weak signal components. When no strong signal component is present, the acquisition threshold is lowered accordingly.

In the low power check performed in step S12, the assignment control unit 22 does not actually examine the correlation power of the signal components being tracked by the synchronization tracking units, but since the synchronization acquisition unit 21 has already searched the entire sliding correlation window for synchronization positions with correlation power exceeding the acquisition threshold, synchronization tracking units tracking synchronization positions at least one chip distant from all of the synchronization positions acquired by the synchronization acquisition unit 21 are appropriate candidates for reassignment. In particular, synchronization tracking units that have wandered away from their synchronization positions will be reassigned, or made inactive, in this way.

There is no fixed low power threshold in the low power check. The level of correlation power that is considered low depends on the acquisition threshold, which varies according to channel conditions. This enables the second embodiment to assign synchronization tracking units in an appropriate manner for all channel conditions.

In a variation of the second embodiment, the synchronization acquisition unit 21 calculates the acquisition threshold by subtracting a predetermined constant from the maximum correlation power found in the preceding sliding correlation. This variation is particularly useful when power is measured in logarithmic units such as decibels.

Next, a third embodiment will be described. The third embodiment is generally similar to the first embodiment, but assigns synchronization tracking units in a fixed priority order, and does not deactivate assignable synchronization tracking units that are not reassigned to new synchronization positions.

Figure 5:
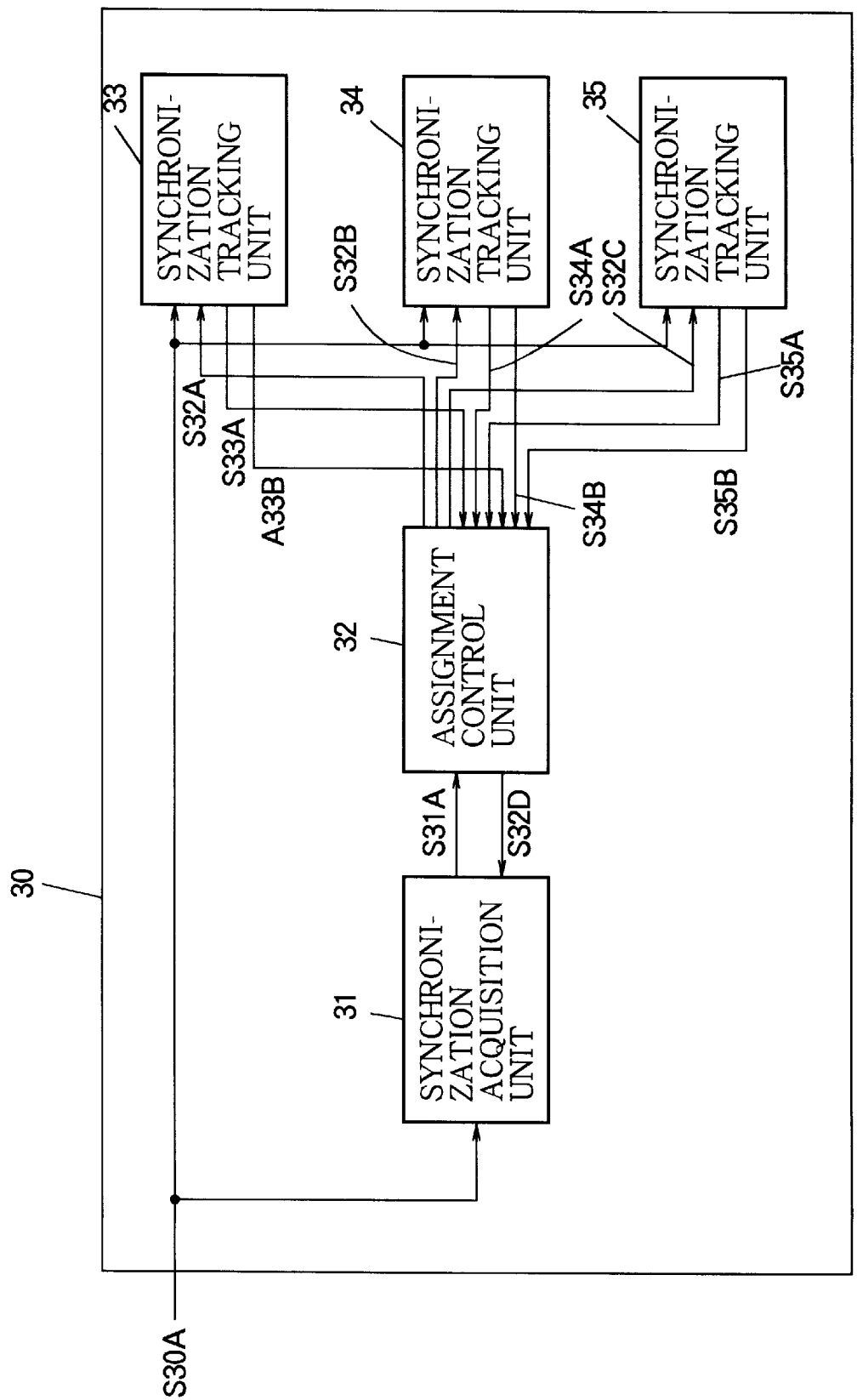
FIG. 5 is a block diagram of a third embodiment of the invention.

Referring to FIG. 5, the third embodiment is a spreading code synchronization circuit 30 comprising a synchronization acquisition unit 31, an assignment control unit 32, and a plurality of synchronization tracking units 33, 34, 35. A received signal S30A is supplied to the synchronization acquisition unit 31 and the synchronization tracking units 33, 34, 35. The synchronization acquisition unit 31 sends an acquired synchronization position signal S31A to the assignment control unit 32, and receives a window centering signal S32D from the assignment control unit 32. The assignment control unit 32 sends synchronization position assignment signals S32A, S32B, S32C to the synchronization tracking units 33, 34, 35, and receives synchronization position signals S33A, S34A, S35A and correlation power signals S33B, S34B, and S35B from the synchronization tracking units 33, 34, 35, as in the first embodiment.

The synchronization acquisition unit 31 operates as in the first embodiment, using a fixed acquisition threshold.

Figure 6:
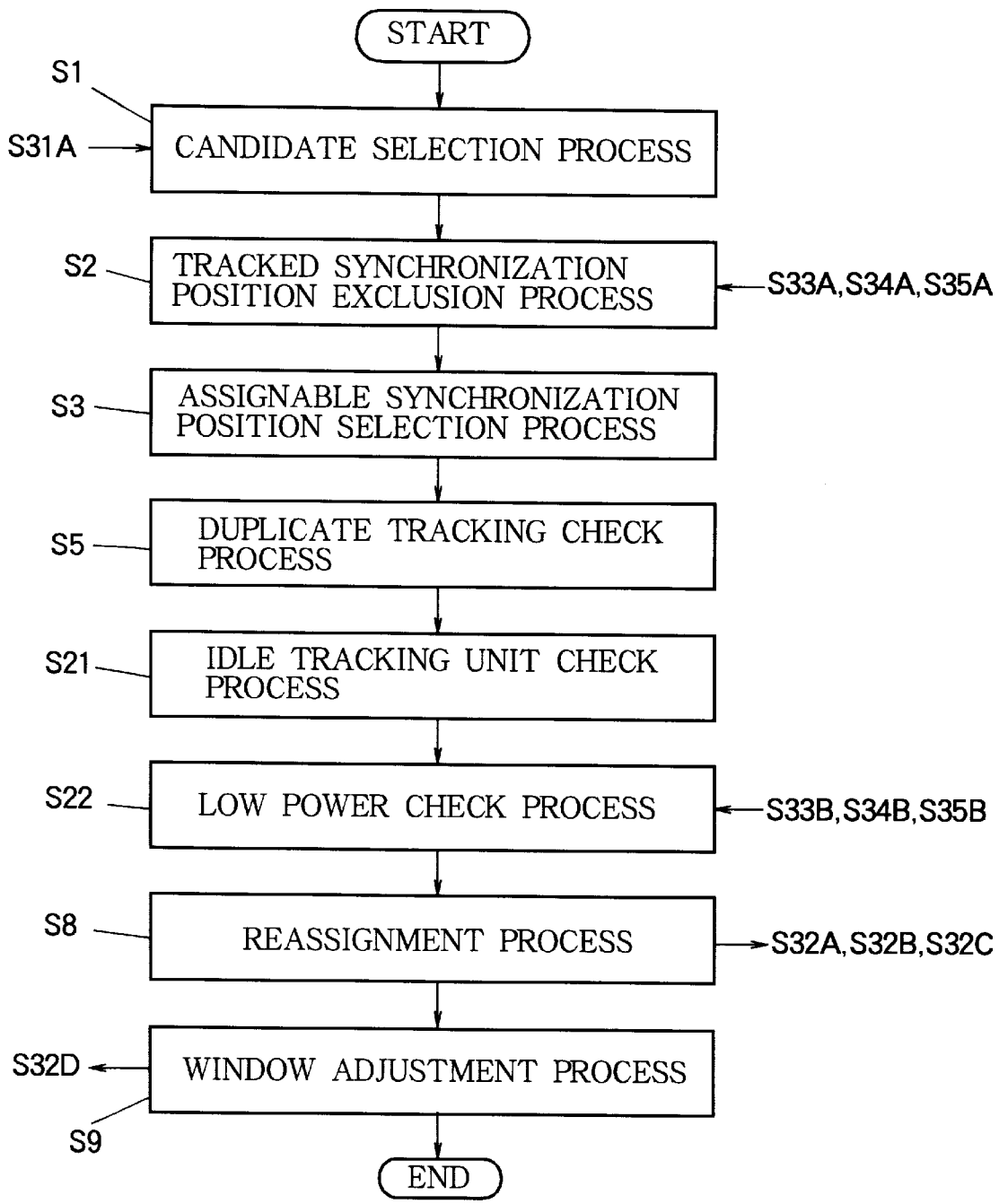
FIG. 6 is a flowchart illustrating the operation of the third embodiment.

The operation of the assignment control unit 32 will be described with reference to the flowchart in FIG. 6.

Steps S1, S2, and S3 are the same candidate selection process, tracked synchronization position exclusion process, and assignable synchronization position selection process as performed in the first embodiment. These steps result in the selection of a number N of assignable synchronization positions.

Step S5 is a duplicate tracking check process similar to step S5 in the first embodiment. If T synchronization tracking units 33, 34, 35 are tracking synchronization positions mutually separated by less than one chip, where T is an integer greater than one, the assignment control unit 32 leaves one of these synchronization tracking units to track its current synchronization position. The other T−1 synchronization tracking units are selected as assignable synchronization tracking units, provided T−1 is equal to or less than the above number N. If T−1 is greater than N, then N of the T−1 synchronization tracking units are selected as assignable, and the other T−N−1 synchronization tracking units are made inactive.

Step S21 is an idle tracking unit check process generally similar to step S4 in the first embodiment. If the number of synchronization tracking units 33, 34, 35 selected as assignable in the duplicate tracking check process (step S5) was less than N, then inactive synchronization tracking units are selected as assignable, until the total number of assignable synchronization tracking units reaches the number N, or until there are no more inactive synchronization tracking units to be selected.

Step S22 is a low power check process generally similar to step S6 in the first embodiment. If the total number of synchronization tracking units 33, 34, 35 selected as assignable in steps S5 and S21 is still less than N, synchronization tracking units tracking synchronization positions with correlation power values less than a predetermined low power threshold, as indicated by the correlation power signals S33B, S34B, S35B, are added to the set of assignable synchronization tracking units, until the total number of assignable synchronization tracking units is equal to N.

Steps S8 and S9 are the same reassignment process and window adjustment process as performed in the first embodiment.

The synchronization tracking units 33, 34, 35 operate as in the first embodiment.

The third embodiment gives first priority to reassigning synchronization tracking units that are tracking duplicate synchronization positions. These synchronization tracking units are reassigned even before inactive synchronization tracking units are assigned. In addition, synchronization tracking units tracking synchronization positions with low correlation power are allowed to remain active unless needed for reassignment to newly acquired synchronization positions.

The third embodiment thereby maintains maximum path diversity among the synchronization tracking units, which are kept tracking as many different synchronization positions as possible. This reassignment strategy is particularly effective under adverse reception conditions when the received power is low and there are many multipath components.

In a variation of the third embodiment, the acquisition threshold is calculated as in the second embodiment.

In another variation, in the low power check process (step S22), synchronization tracking units are selected for reassignment in increasing order of the correlation power indicated by the correlation power signals S33, S34, S35, starting from the lowest correlation power, without any fixed low power threshold being set. This assures that the number of assignable synchronization tracking units can always be brought to the necessary number N.

As described above, in reassigning RAKE receiver fingers by reassigning their synchronization tracking units, the present invention follows a strategy that attempts to receive the largest number of different valid signal components, while avoiding unnecessary reassignment. It is anticipated that the invention can improve receiver performance and reduce interruptions in receiver operation under adverse reception conditions.

The idle tracking unit check process and low power check process in the first and second embodiments can be modified to stop selecting additional assignable synchronization tracking units when the total number of assignable synchronization tracking units selected so far reaches the number N of assignable synchronization positions, as in the third embodiment.

Alternatively, in any of the preceding embodiments, the total number of synchronization tracking units selected as assignable can be limited to the above-described number M, which is the maximum possible value of N, or to the number of synchronization tracking positions on the candidate list. As another alternative, the total number of synchronization tracking units selected as assignable can be limited to the smaller of N and a predetermined constant C, so that not more than C synchronization tracking units are reassigned at once.

Although three synchronization tracking units were shown in the drawings, the number of synchronization tracking units may be greater than or less than three. Even when there is only one synchronization tracking unit, the invented method can be applied to avoid unnecessary reassignment of the synchronization tracking unit.

Those skilled in the art will recognize that further variations are possible within the scope claimed below.

What is claimed is:

1. A spreading code synchronization circuit in a receiver in a spread-spectrum mobile communication system, comprising:

a synchronization acquisition unit performing a sliding correlation of a received signal and a spreading code by varying a phase of the spreading code over a range of synchronization positions within a sliding correlation window, thereby obtaining an acquisition list of synchronization positions with correlation power values exceeding an acquisition threshold;

a positive number of synchronization tracking units, each activated by provision of an assigned synchronization position and, while active, tracking a synchronization position of said spreading code with said received signal, starting from said assigned synchronization position; and an assignment control unit coupled to said synchronization acquisition unit and said synchronization tracking units, selecting from said acquisition list a candidate list of synchronization positions mutually separated by at least a predetermined phase difference, and performing a tracked synchronization position exclusion process of comparing the synchronization positions on said candidate list with synchronization positions already being tracked by active synchronization tracking units, and removing from said candidate list those synchronization positions that are separated by less than a predetermined threshold from the synchronization positions already being tracked, an assignable synchronization position selection process of selecting, as assignable synchronization positions, a number of most strongly correlated synchronization positions from the synchronization positions remaining on said candidate list, an idle tracking unit check process of selecting inactive synchronization tracking units as assignable synchronization tracking units, a duplicate tracking check process of comparing the synchronization positions being tracked by the active synchronization tracking units, and if a plurality of said synchronization tracking units are tracking substantially identical synchronization positions, selecting all but one of said plurality of synchronization tracking units as assignable synchronization tracking units, a low power check process of selecting active synchronization tracking units tracking synchronization positions with low correlation power as assignable synchronization tracking units, a reassignment process of assigning the assignable synchronization positions selected in said assignable synchronization position selection process to the assignable synchronization tracking units selected in said idle tracking unit check process, said duplicate tracking check process, and said low power check process, and a window adjustment process of selecting the sliding correlation window to be used next by said synchronization acquisition unit.

2. The spreading code synchronization circuit of claim 1, wherein:

each active synchronization tracking unit measures a correlation power at the tracked synchronization position, and outputs a tracking correlation power value; and said low power check process compares the tracking correlation power value output by each said active synchronization tracking unit with a predetermined low power threshold, and selects active synchronization tracking units having tracking correlation power values below said low power threshold as assignable synchronization tracking units.

3. The spreading code synchronization circuit of claim 1, wherein said low power check process selects active synchronization tracking units tracking synchronization positions that are removed by at least a predetermined phase distance from all of the synchronization position s on said acquisition list.

4. The spreading code synchronization circuit of claim 1, wherein said window adjustment process centers said sliding correlation window at a midpoint of the synchronization positions tracked by the active synchronization tracking units.

5. The spreading code synchronization circuit of claim 1, wherein said acquisition threshold has a fixed value.

6. The spreading code synchronization circuit of claim 1, wherein said synchronization acquisition unit stores a maximum correlation power value obtained in a preceding sliding correlation, and calculates said acquisition threshold by dividing the stored maximum correlation power value by a predetermined constant.

7. The spreading code synchronization circuit of claim 1, wherein said synchronization acquisition unit stores a maximum correlation power value obtained in a preceding sliding correlation, and calculates said acquisition threshold by subtracting a predetermined constant from the stored maximum correlation power value.

8. The spreading code synchronization circuit of claim 1 wherein, in said reassignment process, said assignment control unit assigns the assignable synchronization positions selected in said assignable synchronization position selection process first to the assignable synchronization tracking units selected in said duplicate tracking check process, then, if any unassigned assignable synchronization positions remain, to the assignable synchronization positions selected in said idle tracking unit check process, and finally, if any unassigned assignable synchronization positions still remain, to the assignable synchronization positions selected in said low power check process.

9. A method assigning synchronization positions to synchronization tracking units that, while active, track respective synchronization positions of a spreading code with a received signal, starting from an assigned synchronization position in a receiver, in a spread-spectrum mobile communication system, comprising the steps of:

(a) performing a sliding correlation of said received signal and said spreading code by varying a phase of said spreading code over a range of synchronization positions within a sliding correlation window, thereby obtaining an acquisition list of synchronization positions with correlation power exceeding an acquisition threshold;

(b) selecting from said acquisition list a candidate list of synchronization positions mutually separated by at least a predetermined phase difference;

(c) comparing the synchronization positions on said candidate list with synchronization positions already being tracked by active synchronization tracking units, and removing from said candidate list those synchronization positions that are separated by less than a predetermined phase distance from the synchronization positions already being tracked;

(d) selecting, as assignable synchronization positions, a predetermined number of most strongly correlated synchronization positions from the synchronization positions remaining on said candidate list;

(e) selecting inactive synchronization tracking units as assignable synchronization tracking units;

(f) comparing the synchronization positions being tracked by the active synchronization tracking units, and if a plurality of said synchronization tracking units are tracking substantially identical synchronization positions, selecting all but one of said plurality of synchronization tracking units as assignable synchronization tracking units;

(g) selecting active synchronization tracking units tracking synchronization positions with low correlation power as assignable synchronization tracking units;

(h) assigning the assignable synchronization positions selected in said step (d) to the assignable synchronization tracking units selected in said steps (e), (f), and (g); and (i) selecting the sliding correlation window to be used next in said step (a).

10. The method of claim 9, wherein said step (h) assigns said assignable synchronization positions first to the assignable synchronization tracking units selected in said step (f), then, if any unassigned assignable synchronization positions remain, to the assignable synchronization positions selected in said step (e), and finally, if any unassigned assignable synchronization positions still remain, to the assignable synchronization positions selected in said step (g).

* * * * *